March 9, 1971 — G. W. BALTZ — 3,568,325
LIQUID LEVEL DEVICE
Filed Nov. 17, 1969 — 3 Sheets-Sheet 1
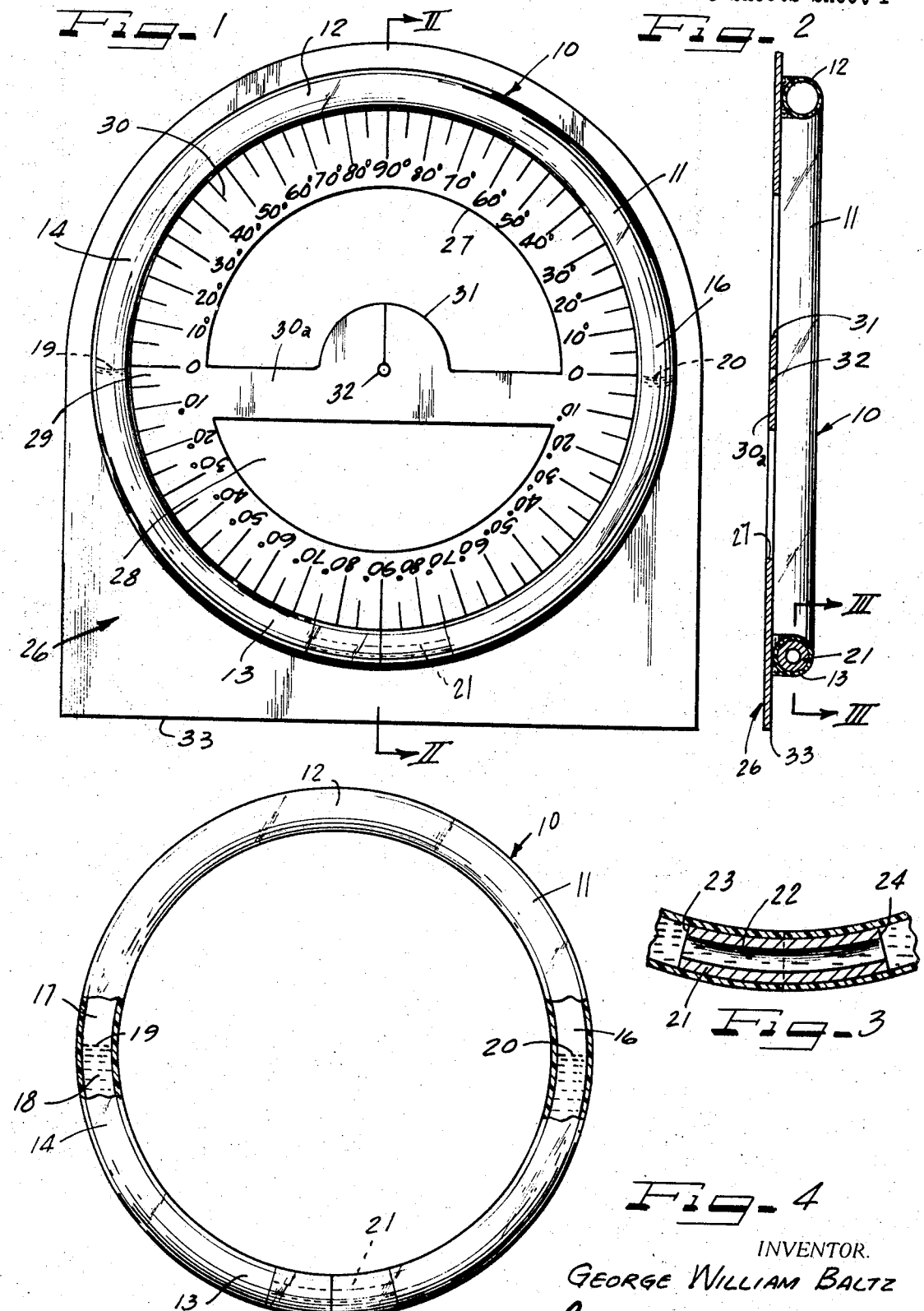
INVENTOR.
GEORGE WILLIAM BALTZ
BY Hill, Sherman, Meroni, Gross & Simpson ATTORNEYS

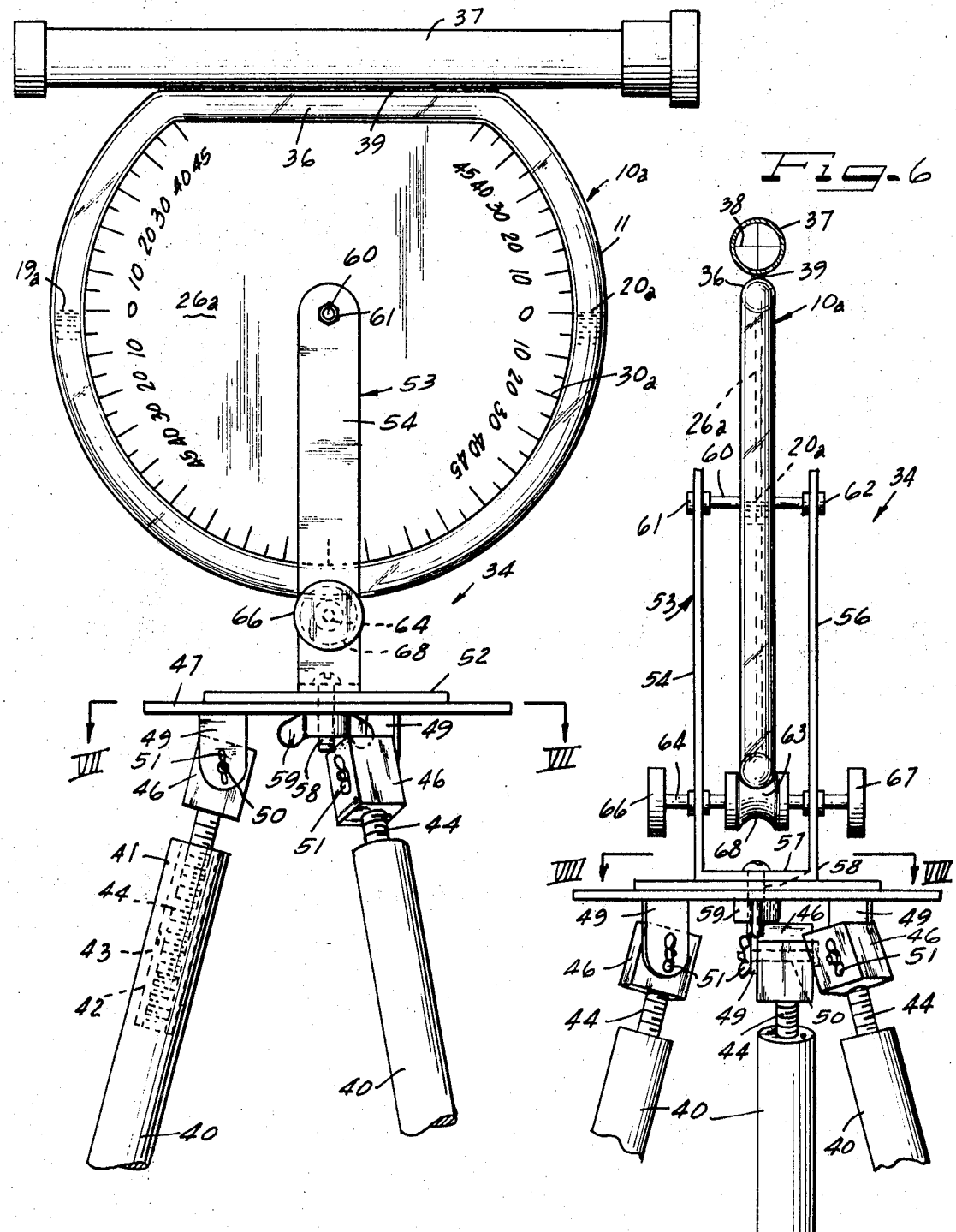

March 9, 1971 — G. W. BALTZ — 3,568,325
LIQUID LEVEL DEVICE
Filed Nov. 17, 1969 — 3 Sheets-Sheet 3
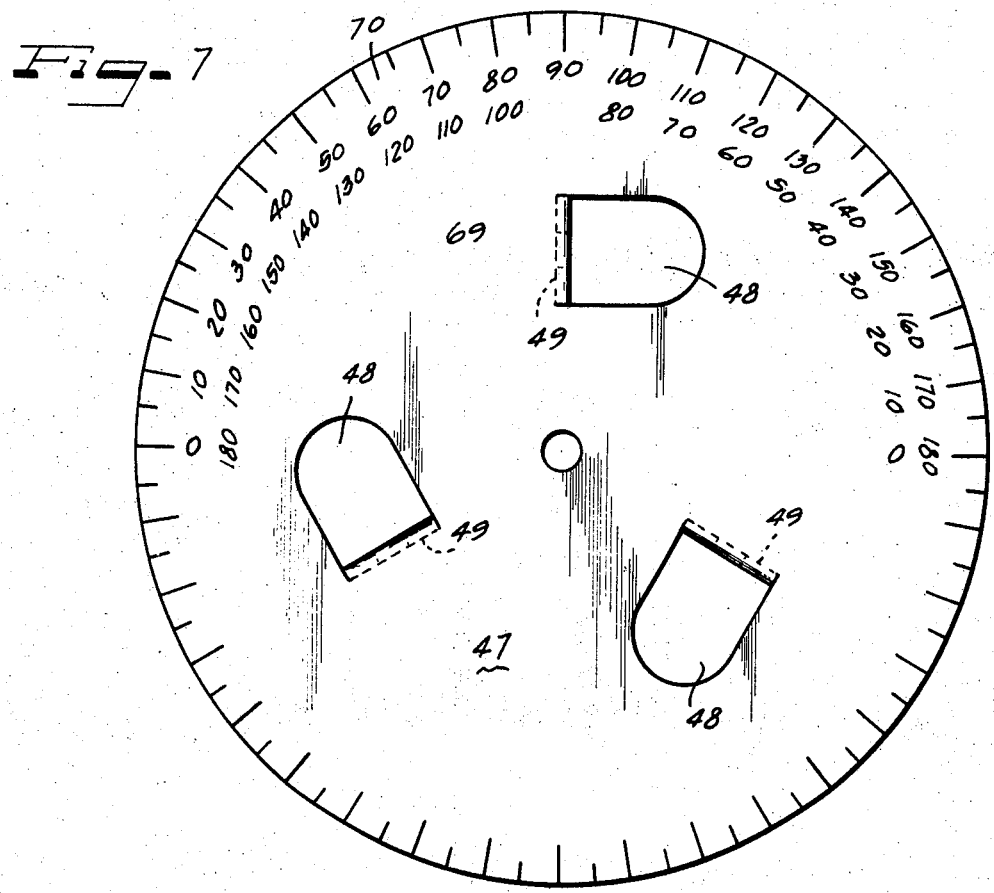
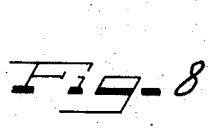
INVENTOR.
GEORGE WILLIAM BALTZ

United States Patent Office 3,568,325
Patented Mar. 9, 1971

3,568,325
LIQUID LEVEL DEVICE
George William Baltz, R.R. 4,
Pocahontas, Ark. 72455
Filed Nov. 17, 1969, Ser. No. 877,404
Int. Cl. G01c 1/02, 9/20
U.S. Cl. 33—69                                    1 Claim

ABSTRACT OF THE DISCLOSURE

The disclosure includes a liquid level device comprising a circular tube made of clear plastic and partially filled with colored water. The tube may be mounted on a protractor for measuring angles relative to the horizontal. The disclosure also includes a method of ascertaining the water line of a proposed stock pond or the like through the use of the liquid level device. In addition the disclosure includes a transit theodolite which comprises a plastic liquid level device having a telescope mounted thereon, the entire assembly being mounted on adjustable legs.

BACKGROUND OF THE INVENTION

This invention relates to the field of liquid levels.

Most liquid levels of which I am aware comprise essentially a glass tube nearly filled with alcohol, ether or the like and enclosing a moveable bubble which when centered indicates the tangent to the tube at the point or the line of sight to be truly horizontal.

Such known levels have wide utility. For example, they are often used in building construction for determining plumb lines and are also employed in transit theodolites used in surveying.

The use of bubble type levels is limited, however, to those applications and to those kinds of instruments in which the location of the bubble itself is readily ascertainable. Furthermore it is often difficult to accurately read a bubble type level due to the minuscule size of the bubble and of the center markings on the glass tube.

The present invention provides for increased application of liquid levels, is easier to use in many instances than prior levels and provides an interesting and educational tool for children, all of which are objects of the invention. In addition, it is inexpensive to manufacture and fairly immune from inadvertent breakage.

The invention may be summarized as comprising an endless, closed, hollow tube which is partially filled with liquid to provide two spaced columns interconnected at the top and bottom portions thereof. The tube may be made of clear plastic and the liquid may simply be water, colored to facilitate reading of the meniscuses in the two columns.

The tube may be circularly shaped and a protractor may be mounted thereon so that the level may be utilized in the manner of a transit thedolite.

The tube may be made of inexpensive plastic to virtually preclude breakage. An apertured plug may be inserted in the tube to provide a restricted orifice for the liquid passing therethrough as it seeks a common level in the two columns. The orifice almost entirely eliminates oscillation of the liquid so that the meniscuses are in position to be read as soon as the level is brought to a vertical position.

In addition to the novel liquid level itself, in another respect the invention involves the method of utilizing a two-column liquid level to visually ascertain the water level of a proposed stock pond or the like body of water. In another respect the invention involves an inexpensive transit theodolite which utilizes the novel liquid level of the invention.

Other objects, features and advantages of the invention will be readily apparent from the following description of preferred embodiments thereof, taken in conjunction with the accompanying drawing, although variations and modifications may be effected without departing from the spirit and scope of the novel concepts of the disclosure.

BRIEF DESCRIPTION OF THE DRAWING

FIG. 1 is an elevational view of a liquid level constructed in accordance with the principles of the present invention mounted on a protractor.

FIG. 2 is a vertical cross-sectional view taken along lines II—II OF FIG. 1.

FIG. 3 is a cross-sectional view of the apertured plug press-fitted in the liquid level tube taken along lines III—III of FIG. 2.

FIG. 4 is an elevational view of the liquid level shown in FIG. 1 with the protractor removed and with portions of the tube shown in section.

FIG. 5 is a front elevational view of a transit theodolite which incorporates the principles embodied in the liquid level device shown in FIG. 1.

FIG. 6 is an elevational end view of the transit shown in FIG. 5.

FIG. 7 is an enlarged plan view of one component of the transit as viewed along lines VII—VII of FIG. 5.

FIG. 8 is an enlarged view of another component taken along lines VIII—VIII of FIG. 6.

DESCRIPTION OF THE PREFERRED EMBODIMENT

Referring to the drawing, a liquid level constructed in accordance with the principles of the present invention is indicated generally at reference numeral 10 in FIGS. 1–4. The device 10 may be more particularly characterized as comprising an endless hollow tube 11 which includes upper and lower segments or portions 12 and 13 and vertical legs or side portions 14 and 16 which interconnect the upper and lower portions 12 and 13. The side portions 14 and 16 may be considered to be two separate spaced vertical columns which are interconnected at their top ends through the upper portion 12 and at their bottom ends by virtue of the bottom portion 13.

The hollow of the tube 11, indicated at reference numeral 17, is partially filled with liquid 18 which rises in the side portions 14 and 16 to a common level when the essentially planar tube 11 is raised to a vertical position. The meniscuses indicated at reference numerals 19 and 20 formed respectively at the upper ends of the liquid columns in the side portions 14 and 16 reside together in a truly horizontal line.

The tube 11 may be circularly shaped and made of clear plastic not only to facilitate visual observation of the meniscuses 19 and 20 but also to reduce the likelihood of inadvertent breakage of the level 10. The liquid, unlike that used in most spirit or bubble-type levels, may simply be water. The water may be colored to additionally facilitate ready eye alignment of the meniscuses 19 and 20.

A plug 21 is press-fitted into the bottom portion 13 of the tube 11. The plug 21 is generally cylindrically shaped but conforms to the curvature of the tube 11. An axial passageway 22 extends from one end 23 of the plug 21 to an opposite end 24 to provide a restricted orifice through which the liquid 18 flows as it seeks its own level in the two columns 14 and 16. In the illustrated embodiment the free cross-sectional area of the passage 22 is approximately one-half that of the tube 11. I have found that this relationship provides a good dampening effect in a level in which the tube 11 is a circle of approximately twelve inches in diameter and wherein the cross-sectional diameter of the tube itself is approximately ⅝ inch.

For example, I have observed that a liquid level 10 constructed to substantially the above dimensions provides a very rapid reading with almost no discernible oscillation of the meniscuses 19 and 20 as long as the plug 21 resides in the lower portion 13 so that the liquid 18 flows through it in seeking its level. On the other hand without the plug 21 the meniscuses 19 and 20 oscillate quite noticeably and generally require five to fifteen seconds to become stabilized after the tube 11 has been brought to a vertical position.

In the embodiment shown in FIGS. 1 and 2 the tube 11 is mounted on a flat sheet-form plate member 26 having an inner circular edge 27 forming an opening 28 centrally thereof. The circular tube 11 is concentrically disposed and of an increased diameter with respect to the opening 28 such that an annular portion 29 of the plate member 26 is disposed radially inwardly of the circular tube 11. Protractor indicia as designated at reference numeral 30 is formed on the annular portion 22 and may be divided in four 90° quadrants as shown in FIG. 1.

A transverse arm 30a of the plate member 26 extends across the opening 28 in slightly offset relation to the center of opening 28 and comprises an embossment or projection 31 which surrounds the center of the opening 28, at which center an aperture 32 is formed.

In applications wherein the tube 11 is mounted on the protractor 26 the liquid 18 half-fills the tube 11. Consequently when the device 10 is brought into a vertical position the liquid 18 extends around the tube 180° between the meniscuses 19 and 20.

The level 10 may be utilized in a variety of applications. For example, when it is mounted on a protractor or angle scale 26 having one side 33 thereof squared and in parallel alignment with the 0–90°–180° line of the protractor the invention may be utilized for ascertaining a plumb line. Because of the increased size in which the tube 11 may easily be made the readings with respect to plumb are generally more accurate than those available from the usual spirit level. In addition, the invention is more easily handled and is more convenient to use in work such as carpentry than the conventional spirit level. Further, it can tolerate mishandling to a greater extent than the conventional spirit level without being subject to damage.

Another manner in which I have utilized the present invention is for determining the water level or shore line of a fish or stock pond. By merely standing so that eye level is at the proposed level of the stock pond the liquid level 10 can be held to the eye and moved in transit across the ground surface to be covered by the stock pond, and along the line in which the meniscuses 19 and 20 extend to the ground surface, the water level or shore line of the stock pond will run.

Another method is available for more accurately determining the shore line. This method utilizes two stakes. The first is set in the ground so that the top or an otherwise marked portion thereof is at eye level. The liquid level device 10 is mounted at eye level on the top of the other stake. With the second stake the surveyor moves along the ground surface and at intervals places the second stake on the ground and sights back along a line concident with the meniscuses 19 and 20 to the top of the first stake. Whenever the sighted line coincides with the top of the first stake, the second stake is then positioned on the ground at a point on the proposed stock pond shore line.

The above method requires only one person rather than the two persons (including a rod man) that would generally be required to perform the same job using a conventional transit theodolite. While the survey may often not be as accurate as it would be using a theodolite (because of the magnification properties of the more expensive instrument) it will be quite satisfactory in most instances.

The liquid level device 10 may also be used as an educational tool. For example, Boy Scouts can be taught to ascertain the heighth of an object such as a flag pole by using the protractor-equipped level as illustrated in FIGS. 1 and 2.

For example, to determine the height of a flag pole the user stands adjacent the pole and makes a mark at eye level. Then he steps off a distance along the ground from the base of the pole, sighting back to the eye level mark on the pole, until the top of the pole is aligned with the 45° mark on the protractor scale while the meniscuses 19 and 20 are aligned with the eye level mark on the pole. The distance from the eye level mark on the pole to the top of the pole is equal to the distance stepped off from the base of the pole to the point at which the top of the pole is aligned with the 45° mark on the protractor scale. By adding to that distance the distance from the base of the pole to the eye level mark the overall height of the flag pole may be easily calculated. Many other interesting and educational exercises can be performed with the liquid level device 10 and the imagination and resourcefulness of youngsters can lead to countless additional exercises.

As a result of the plastic construction of the tube 11 the device 10 is virtually immune from damage. Furthermore it may be manufactured so economically as to substantially increase the applications of liquid levels in every day use.

The aperture 32 is used for centering purposes. For example, a pencil point may be inserted therethrough so that the protractor 26 may be used in the manner of a conventional protractor. The transverse arm 30 is slightly offset from the center of the protractor opening 28 to reduce interference when sighting along the 0°–0° markings on the protractor indicia.

The tube 11 may be affixed to the protractor 26 in any suitable manner. In applications which make it desirable to be able to remove the tube 11 from the protractor 26, releasable clamps may be used. On the other hand adhesive cement or the like may be used when it is desired to make the tube-protractor assembly a permanently fixed assembly.

Referring to FIGS. 5–8 there is illustrated therein a liquid level indicated generally at reference character 10a constructed in accordance with the principles of the present invention and combined with other components to provide a novel transit theodolite indicated generally at reference numeral 34.

The liquid level 10a is similar to the embodiment thereof disclosed in FIGS. 1–4 and includes a generally circularly shaped, vertically upright, closed, transparent, hollow tube 11a which is half-filled with colored liquid as shown at the meniscuses thereof at 19a and 20a.

Securely fastened to the tube 11a is a thin, flat, sheet-form web or protractor member 26a on which are marked suitable protractor calibrated indicia as shown in reference numeral 30a.

The tube 11a further comprises a flattened top portion 36 to which is securely fastened a telescope 37 which is aligned with the tube 11a to sight along a line which is in the central vertical plane of the tube 11a. The telescope 37 need not be expensive; indeed, one of my objects in respect of this aspect of the invention is to provide a very inexpensive transit assembly. While the telescope 37 may have the usual cross-hairs 38 it need be no better in terms of magnification and accuracy than the type of work to which the transit 34 will be put to use may require. This telescope 37 may be secured to the tube 11a by any suitable means such as, for example, a cement or adhesive bond or the like as indicated at 39.

The upper portion of the transit 34 including the tube 11a and the telescope 37 are supported on a plurality of adjustable legs indicated at 40. Each of the legs 40 comprises an upper portion 41 centrally bored as at 42 to receive an internally threaded sleeve 43 which in turn receives a threaded stud 44, an upper end 46 of which is enlarged and squared or shaped in the form of a block.

A preferred number of transit legs 40 may be three as shown in the drawings, and at the upper ends thereof is mounted a relatively large, thin, circularly-shaped disc 47. The disc 47 has three cut-outs 48 stamped therein to provide three depending mounting flanges 49 equally spaced about the center of the disc 47. Each of the squared heads 46 of the threaded studs 44 is adjustably secured to a mounting flange 49 by means of a threaded bolt 50 on which is threaded a wing nut as indicated at 51.

Overlying the disc 47 and in concentric relation therewith is a second thin flat circular disc 52 which is smaller in diameter than the disc 47. A U-shaped mounting bracket 53 is disposed above the disc 52 and comprises a pair of spaced parallel vertically-upright standards 54 and 56 and a horizontal bight portion 57 which interconnects the lower ends of the standards 54 and 56. The bight portion 57 is connected in fixed assembly to the upper disc 52 by means of a weld connection or the like. The bight portion 57, the smaller disc 52 and the larger disc 47 are all centrally apertured to receive a threaded bolt 58 and a wing nut 59 to maintain the parts in adjustably movable assembled relation.

The tube 11a and the web 26a are straddled by the standards 54 and 56 and are rotatably mounted thereon by means of an axle 60 which extends on a horizontal axis through the web or protractor member 26a and is journalled at the opposite ends thereof on the standards 54 and 56, or more particularly, on bearing members 61 and 62 mounted on the standards 54 and 56.

As a consequence of the foregoing arrangement the tube 11a may be rotated or pivoted about the horizontal axis of the axle 60 and may also be rotated about a vertical axis coinciding with the axis of the threaded bolt 58.

In order to maintain the tube 11a in adjusted position and in order to facilitate the adjustability thereof the present invention contemplates the provision of means including a rubber friction pulley 63 disposed between the standards 54 and 56 and rotatably mounted thereon by means of a shaft 64 on the opposite ends of which are mounted a pair of turning knobs 66 and 67. A peripheral wall 68 of the friction pulley 63 is concave and shaped complementarily to the cross-sectional configuration of the tube 11a. The pulley 63 is maintained by the shaft 64 in slight abutting or driving engagement with the tube 11a. Thus, when the pulley 63 is maintained stationarily the tube 11a and therefore the protractor member 26a and the telescope 37 are locked against rotation about the axle 60. When it is desired to adjust the tube 11a about the axle 60, however, it is merely necessary to rotate the turning knobs 66. The corresponding rotation of the pulley 63 will effectively rotate the tube 11a and again when rotation of the knobs 66 and 67 ceases the tube 11a is again locked in position.

It will be readily appreciated from the foregoing that the embodiment of the invention disclosed in FIGS. 5-8 comprises a very simply constructed transit theodolite which can be made of very inexpensive components but nevertheless sufficiently accurate for all or practically most applications of a transit. The liquid level which comprises the tube 11a and the protractor member 26a is much more quickly and easily read than the bubble-type level normally used on a transit. Furthermore it may be adjusted about its central horizontal axis very simply and easily by virtue of the turning knobs 66 and 67 and the friction pulley 63, which arrangement also serves the dual purpose of locking the tube 11a in place after adjustment. The tube may be easily swung about its central vertical axis (the axis of the threaded stud 58) merely by loosening the wing nut 59 and rotating the mounting bracket 53. A top surface 69 of the larger, lower disc 47 is suitably marked with indicia 70 for determining the relative position of the tube 11a and the upper disc 52 is provided with a pointer 71 so that the relative disposition of the tube 11a may be easily ascertained by the user and adjustments in vertical angularity thereof may be quickly, easily and accurately made.

Again it is anticipated that the principles of the present invention lend themselves to inexpensive devices which may be used by younger and less experienced persons for a variety of applications and as an educational tool. The structure lends itself particularly well to immunity from inadvertent damage. It will be appreciated, however, that the transit 34 can also be advantageously utilized by professional persons in the usual applications.

Although minor modifications might be suggested by those versed in the art, it should be understood that I wish to embody within the scope of the patent warranted hereon all such modifications as reasonably come within the scope of my contribution to the art.

I claim as my invention:
1. A transit theodolite comprising
   a liquid level including a generally circular, vertically upright, closed, hollow transparent tube half filled with liquid,
   a vertical sheet-form angle scale connected in fixed assembly to said tube and extending radially inwardly to intersect the axis of said tube,
   a telescope mounted on the top portion of said tube for sighting a line in the vertical plane of said tube,
   a pair of vertical uprights straddling said tube and said angle scale and intersecting the axes thereof,
   horizontal shaft means mounted on said uprights in co-axial alignment with the axes of said tube and said angle scale,
   means on said angle scale for receiving said shaft means for joint rotation of said angle scale and said tube about the axes thereof,
   a resilient pulley mounted on said uprights in constant engagement with said tube for rotating said tube with respect to said uprights, and mounting means including a plurality of leg members for supporting said vertical uprights.

References Cited

UNITED STATES PATENTS

| | | | |
|---|---|---|---|
| 753,149 | 2/1904 | Lankford | 33—69 |
| 967,510 | 8/1910 | Glosser | 33—70(A) |
| 1,383,960 | 7/1921 | Mazzacco | 33—70(A) |
| 1,444,444 | 2/1923 | Babcock | 33—206 |
| 1,699,558 | 1/1929 | Ainsworth et al. | 33—70(A) |
| 2,142,124 | 1/1939 | Gardner | 33—73(F)X |
| 2,588,433 | 3/1952 | Twamley | 33—224UX |

FOREIGN PATENTS

| | | | |
|---|---|---|---|
| 214,596 | 10/1956 | Australia | 33—73(F) |
| 386,817 | 4/1908 | France | 33—206(.2A) |

ROBERT B. HULL, Primary Examiner

U.S. Cl. X.R.

33—70, 206